(12) United States Patent
Jones, IV et al.

(10) Patent No.: US 8,917,608 B2
(45) Date of Patent: Dec. 23, 2014

(54) LOW LATENCY WIFI DISPLAY USING INTELLIGENT AGGREGATION

(75) Inventors: Vincent Knowles Jones, IV, Redwood City, CA (US); Doo Seok Kim, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 206 days.

(21) Appl. No.: 13/467,265

(22) Filed: May 9, 2012

(65) Prior Publication Data

US 2013/0198793 A1 Aug. 1, 2013

Related U.S. Application Data

(60) Provisional application No. 61/592,894, filed on Jan. 31, 2012.

(51) Int. Cl.
| | |
|---|---|
| *H04W 84/10* | (2009.01) |
| *H04N 21/43* | (2011.01) |
| *H04N 21/61* | (2011.01) |
| *H04N 21/6437* | (2011.01) |
| *H04L 29/08* | (2006.01) |
| *H04L 1/16* | (2006.01) |
| *H04L 29/06* | (2006.01) |
| *H04N 21/65* | (2011.01) |
| *H04N 21/4363* | (2011.01) |
| *H04N 21/643* | (2011.01) |
| *H04W 80/02* | (2009.01) |

(52) U.S. Cl.
CPC ........... *H04N 21/65* (2013.01); *H04N 21/4305* (2013.01); *H04N 21/615* (2013.01); *H04N 21/6437* (2013.01); *H04L 69/32* (2013.01); *H04L 1/1614* (2013.01); *H04L 65/607* (2013.01); *H04N 21/43637* (2013.01); *H04L 65/80* (2013.01); *H04L 65/4076* (2013.01); *H04N 21/64322* (2013.01); *H04L 1/16* (2013.01); *H04N 21/6106* (2013.01); *H04W 80/02* (2013.01)
USPC ........................................... 370/241; 370/465

(58) Field of Classification Search
USPC .............................................. 370/329; 725/81
See application file for complete search history.

(56) References Cited

U.S. PATENT DOCUMENTS

| | | | |
|---|---|---|---|
| 2006/0095944 A1 * | 5/2006 | Demircin et al. | ............... 725/81 |
| 2008/0075004 A1 | 3/2008 | Mishima | |
| 2008/0192774 A1 | 8/2008 | Singh et al. | |
| 2010/0162070 A1 | 6/2010 | Das et al. | |
| 2010/0220654 A1 | 9/2010 | Wentink | |
| 2011/0090880 A1 | 4/2011 | Abraham et al. | |
| 2011/0222408 A1 | 9/2011 | Kasslin et al. | |
| 2012/0307746 A1 * | 12/2012 | Hammerschmidt et al. | .. 370/329 |

OTHER PUBLICATIONS

International Search Report and Written Opinion—PCT/US2013/022253—ISA/EPO—Apr. 3, 2013.

* cited by examiner

*Primary Examiner* — Kevin C Harper
*Assistant Examiner* — Derrick V Rose
(74) *Attorney, Agent, or Firm* — Kevin T. Cheatham

(57) ABSTRACT

Certain embodiments relate to systems and methods for coordinating MAC Protocol Data Unit (A-MPDU) frame boundaries within Video frame/slice boundaries for 802.11 MAC implementations. These embodiments facilitate higher throughput and MAC efficiency by utilizing MAC aggregation without generating undue latency penalty. Certain embodiments ensure that Block-ACK windows are aligned with video frame boundaries so that no Block-ACK windows straddle successive video frames.

20 Claims, 4 Drawing Sheets

LOW LATENCY WIFI DISPLAY USING INTELLIGENT AGGREGATION

CROSS REFERENCE TO RELATED APPLICATION(S)

This application claims the benefit of U.S. Provisional Application No. 61/592,894, filed Jan. 31, 2012, the entire content of which is incorporated herein by reference.

TECHNICAL FIELD

The systems and methods disclosed herein relate generally to optimizations to the 802.11 MAC implementation, particularly utilizing MAC aggregation without generating undue latency.

BACKGROUND OF THE INVENTION

Transmission of media, such as streaming video content, across wireless networks may employ a number of different protocols, including the IEEE 802.11 protocol. The 802.11 protocol breaks the media into "packets" of information which are then individually transmitted to the receiving device. During the packet transmissions, the receiver will periodically acknowledge the packets' receipt to the transmitter and will adjust its network parameters, such as its network address, to accommodate other devices on the network. To improve efficiency, the transmitter may group the packets into sets, so that the receiver need not individually acknowledge receipt of each particular packet. Grouping the packets into these sets, or blocks, is known as aggregation. The single group acknowledgment provided by the receiver is referred to as a Block-ACK. Aggregation and acknowledgment via a Block-ACK improves throughput and efficiency for 802.11 implementations as they are handled by a medium access control (MAC) layer of a device. The Block-ACK also reduces compression and collision probabilities from hidden nodes.

Unfortunately, despite these benefits, aggregation may also produce additional end to end latency. End to end latency may be unfavorable for "mirroring" applications where communication must rapidly occur in two or more directions, such as for gaming applications and interactive display applications. Thus, there exists a need to employ wireless data acknowledgement aggregation without the undesirable undue latency penalty.

DETAILED DESCRIPTION

Various of the present embodiments improve 802.11 protocol throughput in the MAC layer of a device by reducing the latency penalty associated with aggregation of acknowledgement signals that occur in the MAC layer of a device. Particularly, certain of the embodiments align the MAC layer and transport stream so that the acknowledgment of a block (a Block-ACK event) of aggregated MAC service data units (MSDU) is aligned with the first and last MSDU of a video frame. As is known, the MSDU is a service data unit that is received from the logical link control (LLC) sub-layer which lies above the medium access control (MAC) sub-layer in a protocol stack. Alignment of the acknowledgment with the video frame MSDUs avoids certain undesirable delays. For example, when the MAC and transport stream are not aligned, the receiving device may delay the MAC release until a Block-ACK event or may decode video asynchronously with the operations of the MAC layer. Alignment will instead remove the need for the MAC layer and decoder to independently time and delay their operations. This may improve the overall efficiency of the system.

System Overview

System Hardware Overview

Figure 1:
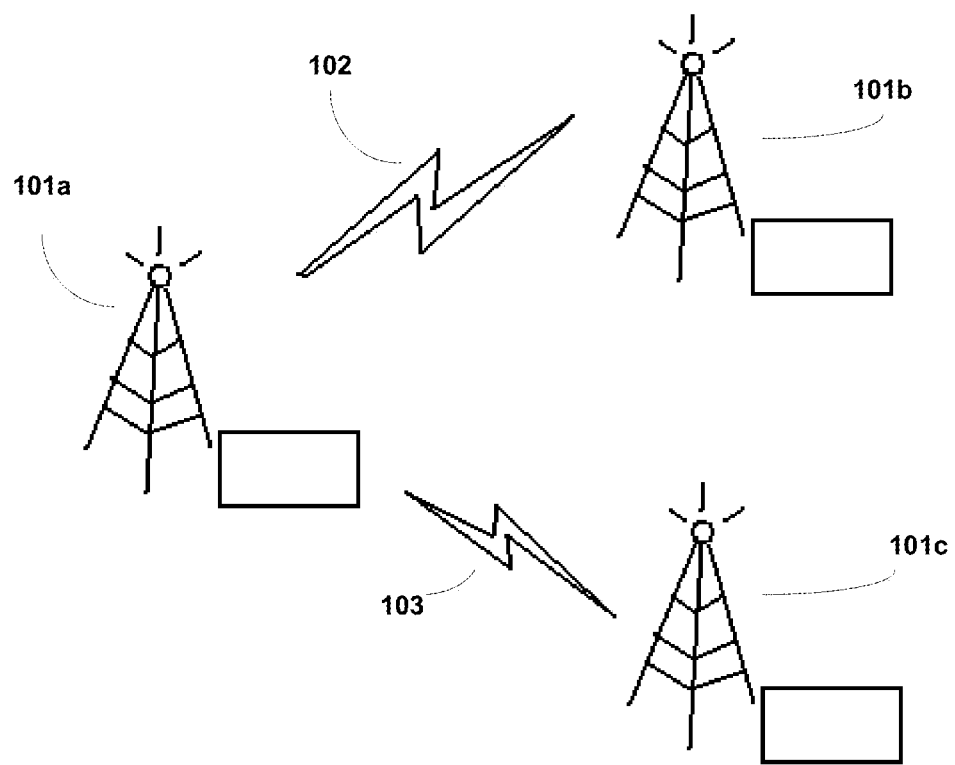
FIG. 1 is a general concept based illustration of various wireless transmission and receiving computer systems which may implement various of the disclosed embodiments.

FIG. 1 provides a general overview for a MAC address 802.11 system. As depicted in the figure, a plurality of devices 101a-c communicate with one another using the 802.11 standard. Each device 101a-c transmits packets via transmissions 102, 103 to another device. The transmissions may, for example, comprise streaming video content. During these transmissions, each device 101a-c may send a plurality of MAC protocol data units (MPDU). An MPDU is a message exchanged between MAC entities, such as devices 101a-c, in a communication system based on the layered OSI model. In systems where the MPDU may be larger than the MSDU, the MPDU may include multiple MSDUs as a result of packet aggregation. In systems where the MPDU is smaller than the MSDU, then one MSDU may generate multiple MPDUs as a result of packet segmentation. Information, such as the streaming video content, may be transmitted via the MPDUs.

Each device 101a-c may use Block-ACKs to send multiple MPDUs without requiring an L2 ACK per MPDU. That is, Block-ACKs may be used to aggregate MPDUs. This improves transmission efficiency as larger amounts of data can be transmitted without waiting for an acknowledgment. Unfortunately, as discussed above, this method may also result in additional latency since the receiving device is obliged to internally buffer out-of-order MSDUs caused by transmission errors.

Furthermore, the receiving device may delay the MAC release until a Block-ACK event. Because the Block-ACK event is delayed until the transmitter exhausts (or terminates) the transmission operation, this may introduce undesirable communication delay. Such additional delay at the receiver may even stall the decoder pipeline.

Certain embodiments mitigate this problem by having the decoder begin decoding only after an entire video frame is delivered. These embodiments may also seek to prevent the Block-ACK sequence from straddling consecutive frames.

Block Sequence

Figure 2:
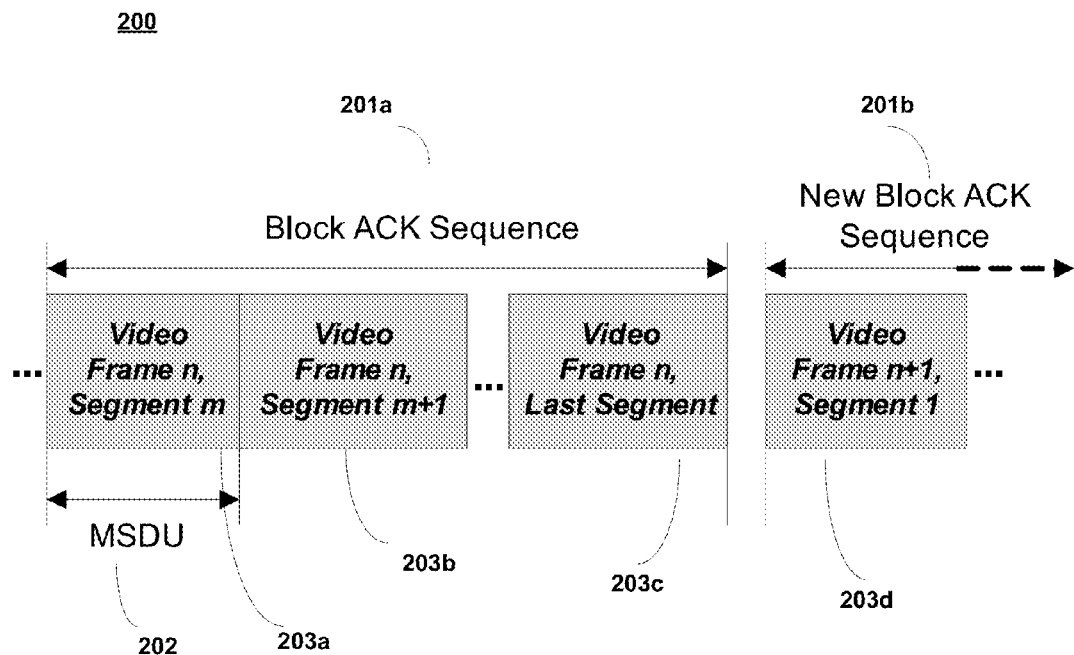
FIG. 2 depicts a sequence of video frame segments organized into blocks pursuant to certain of the embodiments.

FIG. 2 depicts a sequence 200 of video frame segments 203a-d organized into blocks.

To prevent a Block-ACK sequence 201a from straddling consecutive video frames 203a-d, certain embodiments align Block-ACK windows 201a-b with video frame boundaries, as shown in FIG. 2. That is, the Block-ACK sequence 201a aligns with the first 203a and last 203c segments of the video frame transmission. In these embodiments, the transmitter may ensure that while any single video frame may be composed of one or more Block-ACK sequences, a Block-ACK sequence is unconditionally terminated whenever it encounters the terminal MSDU containing the last segment 203c corresponding to a video frame. In some embodiments, the MAC DATA SAP may be further enhanced to flag whether the MSDU 202 should end a Block-ACK window, or whether the MSDU 202 is a terminal MSDU in a video frame or slice.

Hierarchy

Figure 3:
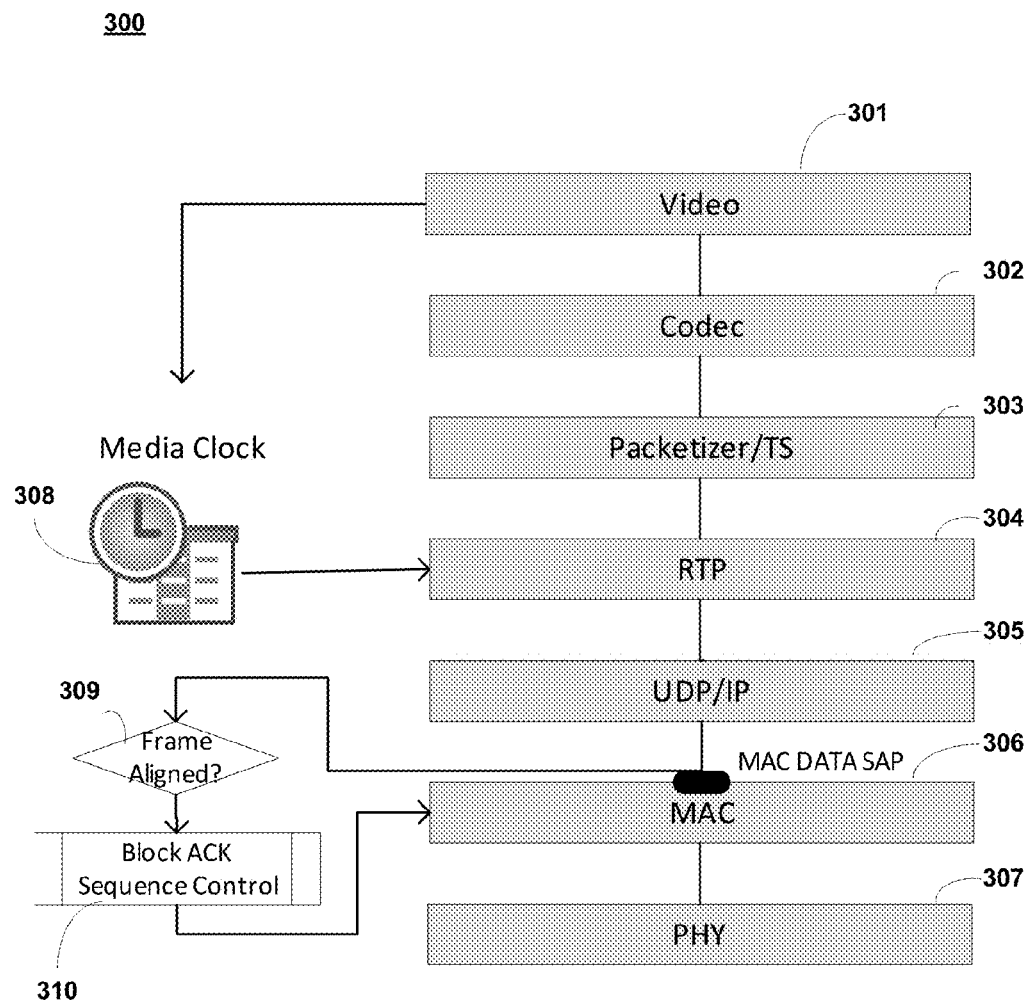
FIG. 3 depicts a communications system hierarchy implementing various of the disclosed embodiments.

FIG. 3 depicts a communications system hierarchy implementing various of the disclosed embodiments. The communications system may, for example, be part of a display system implementing L2 low latency aggregation control for Wi-Fi display. The hierarchy comprises a series of functional blocks 300 performing various functions prior to transmission of the information, such as a video content stream. Media such as video 301 determines the period of clock 308 based upon the frame-rate, or other timing factor, of the content therein. The video 301 may be subsequently passed through a codec 302 and packetizer 303 before entering the real time protocol (RTP) 304 stream. The media clock 308 may be used to facilitate placement in the RTP. The media may then pass through the UDP/IP layer 305. In certain embodiments, prior to entrance at the MAC layer 306, the system may then determine if the frame is aligned 309 and enforce Block-ACK sequence control 310 as discussed above in FIG. 2. The media, altered as necessary to enforce the Block-ACK alignment, may then proceed to the MAC layer 306. The media may subsequently be transmitted at the physical layer 307 to the receiving device.

Algorithm

Figure 4:
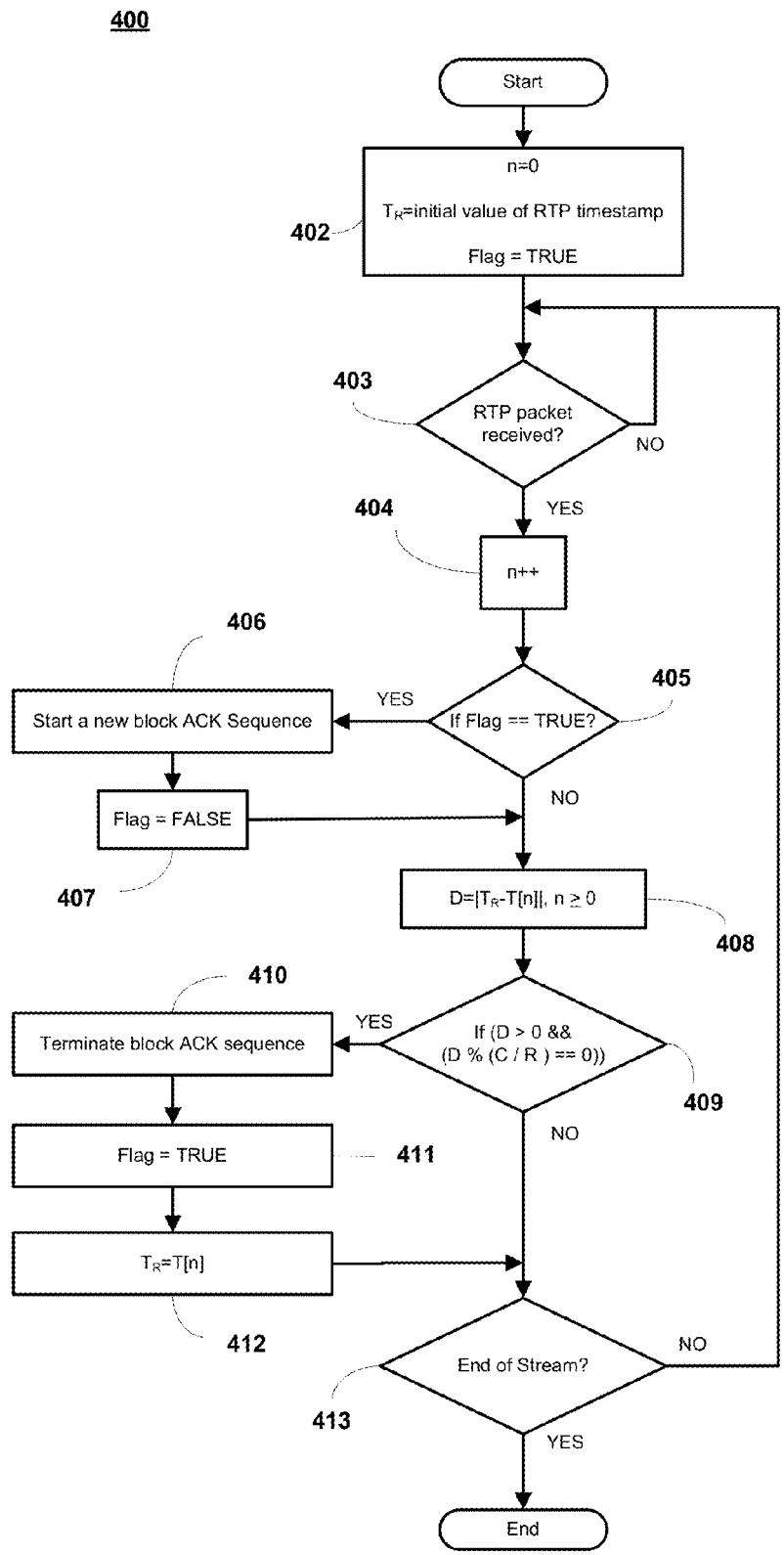
FIG. 4 is a logical flow diagram illustrating certain of the steps as may be performed in certain of the disclosed embodiments for aligning the MAC layer with the transport stream.

FIG. 4 is a logical flow diagram illustrating certain of the steps as may be performed in certain of the disclosed embodiments for aligning the MAC layer with the transport stream. The variables referred to in the figure may be generally defined as follows:

T[n]=Timestamp in the nth-RTP packet;
$T_R$=reference timestamp;
C=video clock used in the RTP stream [KHz];
R=Video frame rate [frame/s]; and
Flag=Boolean flag to start a new Block-ACK sequence.

FIG. 4 merely provides one example implementation of this process. Accordingly, the particular choice of variables used therein is not necessary to achieve the described functionality. For example, the Flag as described here is only for explanatory purposes and one will readily recognize that the Boolean values and control flow queries may be reversed, the Boolean variable substituted for an integer 1 or 0, etc. or any other manner mutatis mutandis in which flag variables are implemented in hardware or software to indicate a particular state. The particular description provided in FIG. 4 is for purposes of explanation and the algorithm itself may be implemented by substituting other variables and control flow structures as are readily known to one skilled in the art.

The process begins at step 402 where the variables may be initialized. In this embodiment, the counter n is set to 0, $T_R$ is set to an initial reference value, such as the value of an RTP timestamp, and the Flag may be set to true so that a new block sequence is begun at step 405. At step 403 the system may wait until an RTP packet is received. Once an RTP packet has been received, the system increments the counter n at step 404. The system may then determine at step 405 whether the Flag is true. As the Flag was initially set to true at step 402, the system will transition to step 406 where a new Block-ACK sequence is begun. To prevent a new sequence from beginning upon the next iteration, the system sets the Flag to false at step 407.

After determining whether to start a new Block-ACK sequence the system then determines the difference D at step 408 between the timestamp of the most recently received RTP packet with the reference timestamp. At step 409 the system then determines if the Block-ACK sequence should be terminated. In this embodiment, the system determines if the difference D is greater than 0 and if D is a multiple of the video clock frequency divided by the video frame rate. If both of these conditions are met, then the system transitions to state 410 and terminates the Block-ACK sequence. The system may also then set the flag to true at step 411 to initiate a new Block-ACK sequence on the next iteration. The system may also set the reference timestamp $T_R$ to the timestamp of the current packet at step 412.

At step 413 the system may then determine if the stream is complete. If the stream is not yet complete, the system may proceed back to state 403 and await receipt of the next RTP packet. In this manner, the system may ensure that the Block-ACK sequences are begun and terminated, such that the MAC layer and transport stream are aligned.

Example

The following is an example application of the above algorithm. For a video payload format comprising a 90 KHz clock, C=90 KHz. If the video frame rate is 30 frames/second, then R=30. It follows that C/R=3,000. In this example, the RTP timestamp would be increased by exactly 3,000 per video frame. The MAC DATA SAP may examine the timestamp in the RTP packet and align the Block-ACK sequence operation with the video frame boundary. In some embodiments, the system may do this regardless of which compression codec scheme is used.

This alignment mechanism may ensure that the receiver MAC will not delay the delivery of any portion of a video frame, while receiving parts of the next video frame. Accordingly, the acts of decoding, post-processing, and rendering a video frame will not be delayed by ongoing wireless transmission of the next video frame. Furthermore, the algorithm does not impose substantial overhead, especially when slicing is used. For example, a full video frame of 720p30 compressed to 10 Mbps requires BA alignment every ~42 Kbytes. Thus, with 8 Kbyte of aggregation, the overhead of terminating a BA window is relatively small.

A system which implements slicing as the pipelined unit may need to implement Block-ACK alignment at the boundaries of these frame slices. MAC efficiency considerations may dictate a lower bound for the pipeline unit however. That is, when slicing is used, aggregation itself may become problematic. For example, slicing every 16 scan-lines would result in MSDU on the order of ~926 bytes.

Benefits

Feeding back to the encoder a signal that indicates successful transmission of the terminal MSDU in a video frame (or slide) may bound delays caused by unexpected transmission error rates over-the-air. In this case, the transmitter application can adapt, by skipping frames, or by scaling other encoder parameters When applying Block-ACK alignment to video frames via the above embodiments, a TX-completion timestamp for the terminal MSDU for every video frame may be computed by the transmitting device. This timestamp may be provided via an enhanced MAC SAP back to the encoder. In conjunction with other statistics, the timestamp may provide a basis for detecting TX latency accumulation, and to trigger suitable adaptation policies in the multimedia transmitter application.

Remarks Regarding Terminology

Unless indicated otherwise, terms as used herein will be understood to imply their customary and ordinary meaning. The steps of a method or algorithm described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium may be coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal All of the processes described above may be embodied in, and fully automated via, software code modules executed by one or more general purpose or special purpose computers or processors. The code modules may be stored on any type of computer-readable medium or other computer storage device or collection of storage devices. Some or all of the methods may alternatively be embodied in specialized computer hardware.

All of the methods and tasks described herein may be performed and fully automated by a computer system. The computer system may, in some cases, include multiple distinct computers or computing devices (e.g., physical servers, workstations, storage arrays, etc.) that communicate and interoperate over a network to perform the described functions. Each such computing device typically includes a processor (or multiple processors or circuitry or collection of circuits, e.g. a module) that executes program instructions or modules stored in a memory or other non-transitory computer-readable storage medium. The various functions disclosed herein may be embodied in such program instructions, although some or all of the disclosed functions may alternatively be implemented in application-specific circuitry (e.g., ASICs or FPGAs) of the computer system. Where the computer system includes multiple computing devices, these devices may, but need not, be co-located. The results of the disclosed methods and tasks may be persistently stored by transforming physical storage devices, such as solid state memory chips and/or magnetic disks, into a different state.

In one embodiment, the processes, systems, and methods illustrated above may be embodied in part or in whole in software that is running on a computing device. The functionality provided for in the components and modules of the computing device may comprise one or more components and/or modules. For example, the computing device may comprise multiple central processing units (CPUs) and a mass storage device, such as may be implemented in an array of servers.

In general, the word "module," as used herein, refers to logic embodied in hardware or firmware, or to a collection of software instructions, possibly having entry and exit points, written in a programming language, such as, for example, Java, C or C++, or the like. A software module may be compiled and linked into an executable program, installed in a dynamic link library, or may be written in an interpreted programming language such as, for example, BASIC, Perl, Lua, or Python. It will be appreciated that software modules may be callable from other modules or from themselves, and/or may be invoked in response to detected events or interrupts. Software instructions may be embedded in firmware, such as an EPROM. It will be further appreciated that hardware modules may be comprised of connected logic units, such as gates and flip-flops, and/or may be comprised of programmable units, such as programmable gate arrays or processors. The modules described herein are preferably implemented as software modules, but may be represented in hardware or firmware. Generally, the modules described herein refer to logical modules that may be combined with other modules or divided into sub-modules despite their physical organization or storage.

All of the methods and processes described above may be embodied in, and fully automated via, software code modules executed by one or more general purpose computers or processors. The code modules may be stored in any type of computer-readable medium or other computer storage device. Some or all of the methods may alternatively be embodied in specialized computer hardware.

While the invention has been discussed in terms of certain embodiments, it should be appreciated that the invention is not so limited. The embodiments are explained herein by way of example, and there are numerous modifications, variations and other embodiments that may be employed that would still be within the scope of the present invention.

What is claimed is:

1. A computing device for stream transport and MAC layer data alignment, comprising:
   a processing module configured to:
      start a Block-ACK sequence based upon a flag;
      determine a relation between a video clock frequency and a video frame rate, the video clock frequency associated with a Real Time Protocol (RTP) stream;
      determine a difference between a first RTP timestamp and a second RTP timestamp, at least the first RTP timestamp derived from a packet in the RTP stream; and
      stop a Block-ACK sequence if the difference is greater than zero and the difference is an integer multiple of the relation.

2. The computing device of claim 1, wherein the relation comprises the video clock frequency divided by the frame rate.

3. The computing device of claim 1, wherein the processing module is further configured to increment a counter.

4. The computing device of claim 1, wherein the second RTP timestamp is a reference RTP timestamp.

5. The computing device of claim 1, wherein the processing module is further configured to reset the flag if the Block-ACK sequence is stopped.

6. A method, implemented using one or more computer systems, for aligning a stream transport and MAC layer, comprising:
   starting a Block-ACK sequence based upon a flag;
   determining a relation between a video clock frequency and a video frame rate, the video clock frequency associated with an RTP stream;
   determining a difference between a first RTP timestamp and a second RTP timestamp, at least the first RTP timestamp derived from a packet in the RTP stream; and
   stopping a Block-ACK sequence if the difference is greater than zero and the difference is an integer multiple of the relation.

7. The system of claim 6, wherein the relation comprises the video clock frequency divided by the frame rate.

8. The system of claim 6, wherein the processing module is further configured to increment a counter.

9. The system of claim 6, wherein the second RTP timestamp is a reference RTP timestamp.

10. The system of claim 6, wherein the processing module is further configured to reset the flag if the Block-ACK sequence is stopped.

11. A non-transient computer-readable medium comprising instructions that when executed cause a processor to perform the method of:

starting a Block-ACK sequence based upon a flag;
determining a relation between a video clock frequency and a video frame rate, the video clock frequency associated with an RTP stream;
determining a difference between a first RTP timestamp and a second RTP timestamp, at least the first RTP timestamp derived from a packet in the RTP stream; and
stopping a Block-ACK sequence if the difference is greater than zero and the difference is an integer multiple of the relation.

12. The system of claim 11, wherein the relation comprises the video clock frequency divided by the frame rate.

13. The system of claim 11, wherein the processing module is further configured to increment a counter.

14. The system of claim 11, wherein the second RTP timestamp is a reference RTP timestamp.

15. The system of claim 11, wherein the processing module is further configured to reset the flag if the Block-ACK sequence is stopped.

16. A computing device for stream transport and MAC layer alignment, comprising:
means for starting a Block-ACK sequence based upon a flag;
means for determining a relation between a video clock frequency and a video frame rate, the video clock frequency associated with an RTP stream;
means for determining a difference between a first RTP timestamp and a second RTP timestamp, at least the first RTP timestamp derived from a packet in the RTP stream; and
means for stopping a Block-ACK sequence if the difference is greater than zero and the difference is an integer multiple of the relation.

17. The computing device of claim 16, wherein the relation comprises the video clock frequency divided by the frame rate.

18. The computing device of claim 16, wherein the processing module is further configured to increment a counter.

19. The computing device of claim 16, wherein the second RTP timestamp is a reference RTP timestamp.

20. The computing device of claim 16, wherein the processing module is further configured to reset the flag if the Block-ACK sequence is stopped.

* * * * *